INVENTOR
HARRIS E. KLUKSDAHL
BY
ATTORNEYS

United States Patent Office 3,660,310
Patented May 2, 1972

3,660,310
HYDROCARBON CONVERSION CATALYST
Harris E. Kluksdahl, San Rafael, Calif., assignor to Chevron Research Company, San Francisco, Calif.
Continuation-in-part of application Ser. No. 729,079, May 14, 1968, now Patent No. 3,558,477, which is a continuation-in-part of application Ser. No. 639,719, May 19, 1967, now Patent No. 3,415,737, which in turn is a continuation-in-part of application Ser. No. 560,166, June 21, 1966. This application Nov. 19, 1969, Ser. No. 878,165
Int. Cl. B01j 11/58, 11/40
U.S. Cl. 252—454
1 Claim

ABSTRACT OF THE DISCLOSURE

A hydrocarbon conversion catalyst comprising a crystalline zeolitic molecular sieve cracking component, 0.01 to 2.0 weight percent, based on said cracking component and calculated as the metal, of a hydrogenating component selected from platinum, palladium and iridium and compounds of platinum, palladium and iridium and 0.01 to 2.0 weight percent, based on said cracking component and calculated as the metal, of a hydrogenating component selected from the group consisting of rhenium and compounds of rhenium.

RELATED APPLICATIONS

Figure 1:
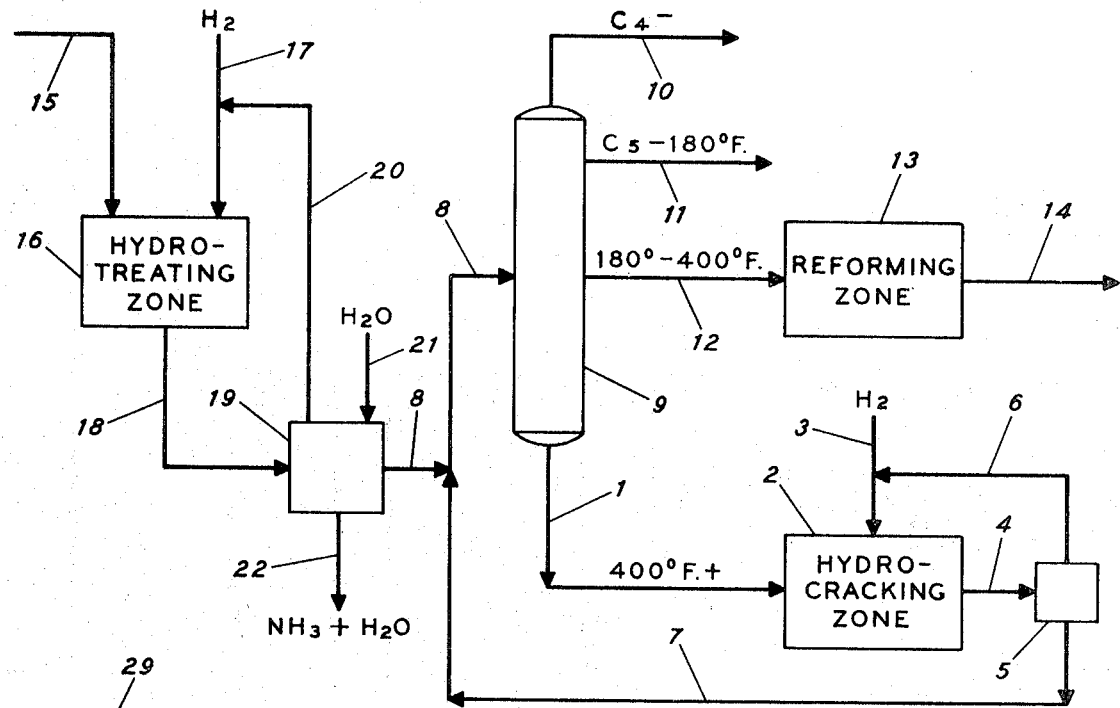

This application is a continuation-in-part of Harris E. Kluksdahl copending application Ser. No. 729,079, filed May 14, 1968, for "Catalyst Composition," now U.S. Pat. 3,558,477, which in turn is a continuation-in-part of application Ser. No. 639,719, filed May 19, 1967, now U.S. Patent 3,415,737, which in turn is a continuation-in-part of application Ser. No. 560,166, filed June 21, 1966, now abandoned.

INTRODUCTION

This invention relates to catalytic conversion, particularly hydrocracking, of petroleum distillates and solvent-deasphalted residua to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al. U.S. Pat. 3,236,761, for example, provides a particular type of decationized zeolitic molecular sieve catalyst, which may be used in some reactions without added metals, and in some reactions with added metals. The various applicable reactions are isomerization, reforming, cracking, polymerization, alkylation, dealkylation, hydrogenation, dehydrogenation and hydrocracking. Rhenium is named as a metal with which the molecular sieve may be loaded, but it is not clear from the patent which reactions such a catalyst would be used to catalyze. No example of a rhenium-molecular sieve catalyst is given, and the hydrocracking portion of the disclosure indicates that the molecular sieve catalyst of the patent may be used for hydrocracking without added metals, but preferably with added platinum or palladium if a metal-loaded molecular sieve is to be used. Further, because of the great stress placed by the Rabo et al. patent on Group VIII metals in association with a molecular sieve cracking component, and particularly the noble metals, and the absence of any interest in rhenium except a passing mention, there is no guide in the patent either as to the applicability of a rhenium-molecular sieve catalyst for the hydrocracking reaction in particular, or to the amount of rhenium such a catalyst should contain, or as to the hydrocracking results that might be expected. Further, there is no suggestion in the patent that rhenium be contained in a catalyst in combination with platinum or palladium, and no suggestion or appreciation of any advantages which might result from such a combination.

It is also known in the art to use 2 weight percent rhenium in association with a gel-type silica-alumina cracking component for the hydrocracking of hydrocarbon fractions. For example, Wilson U.S. Pat. 3,278,418 makes such a disclosure. However, it is also known that such a catalyst has low hydrocracking activity, and that a silver promoter must be used with the rhenium to provide a catalyst having acceptable activity. Accordingly, the Wilson patent indicates that the rhenium-silica-alumina catalyst of his Examples 1 and 2 had activity indices of 42 and 47, respectively, whereas with the addition of a silver promoter for the rhenium, activity indices as high as 95 could be achieved. The data in the Wilson patent indicate that with rhenium levels as high as 2 weight percent, the rhenium-silica-alumina hydrocracking catalyst had only moderate activity. A higher hydrocracking activity would have been obtained with a higher rhenium level, but the cost of rhenium makes higher levels undesirable. Wilson was able partially to solve the problem of maintaining low levels of rhenium and adequate hydrocracking activity by adding a second hydrogenation component—silver—to the catalyst. However, this was accomplished only at a sacrifice in catalyst stability. As correctly indicated by Wilson, a hydrocracking catalyst having a silica-alumina cracking component is extremely nitrogen-sensitive, and the hydrocarbon feed hydrocracked in the presence of such a catalyst must be pretreated to reduce the nitrogen content to a low level; more than minor amounts of nitrogen in the hydrocarbon feed have an intolerable poisoning effect on the acid sites of the cracking component of the catalyst, seriously diminishing cracking activity.

It is also known that conventional catalysts having a crystalline zeolitic molecular sieve cracking component and a platinum hydrogenating component are sulfur sensitive and that while they are more sensitive to organic sulfur compounds they also are sensitive to $H_2S$. In each case, the sulfur acts as a poison, particularly for the hydrogenation component, and reduces the hydrogenation activity of the catalyst, which in turn increases the fouling susceptibility of the catalyst.

OBJECTS

In view of the foregoing, objects of the present invention include providing a hydrocracking catalyst:
(1) Having a cracking component less sensitive to nitrogen poisoning than silica-alumina gel;
(2) Having a plurality of hydrogenating components, each at least as insensitive to sulfur poisoning as platinum;

(3) Having a high hydrocracking activity with economically low levels of the hydrogenating components;

(4) Having a high stability with said low levels of hydrogenating components.

The present invention will best be understood, and further objects and advantages thereof will be apparent, from the following description when read in connection with the accompanying drawing.

DRAWING

Figure 2:
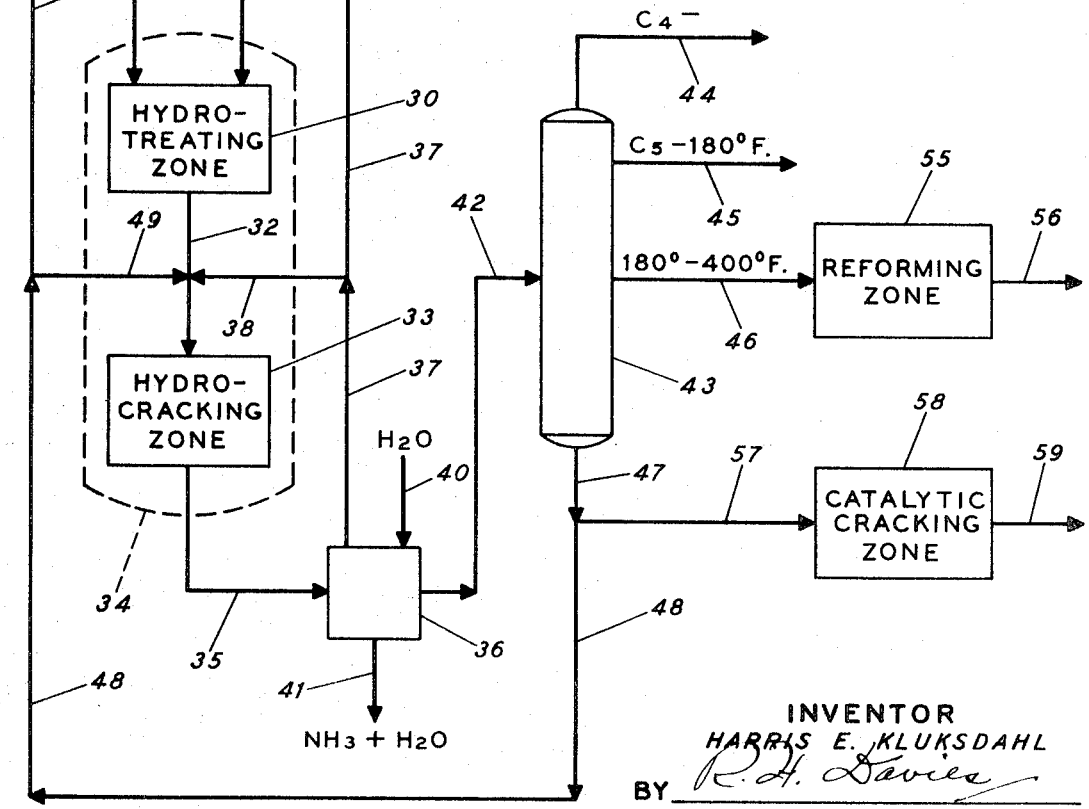

In the drawing, FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed;

FIG. 2 is a diagrammatic illustration of apparatus and flow paths suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

STATEMENT OF INVENTION

It has been found that a hydrocracking catalyst comprising a crystalline zeolitic molecular sieve cracking component, a hydrogenating component selected from platinum, palladium and iridium and compounds of platinum, palladium and iridium, in an amount of 0.01 to 2.0 weight percent, calculated as the metal and based on said cracking component, and a rhenium or rhenium compound hydrogenating component in an amount of 0.01 to 2.0 weight percent, calculated as metal and based on said cracking component, has all of the desirable catalyst attributes listed under *Objects* above and, therefore, in accordance with the present invention there is provided such a catalyst. It is not clear from Rabo et al. U.S. Pat. 3,236,761 that a rhenium-crystalline zeolitic molecular sieve catalyst has application as a hydrocracking catalyst, or what rhenium levels such a catalyst should contain. Even if such matters were clear from Rabo et al., Wilson U.S. Pat. 3,278,418 would lead a man skilled in the art to conclude that such a catalyst would either need to contain more than 2 weight percent rhenium or that it must contain silver in conjunction with the rhenium to obtain adequate hydrocracking activity. It has been found that neither of these conclusions is correct. Wilson also would lead a man skilled in the art to conclude, even if he considered use for hydrocracking of the catalyst of the present invention that the hydrogenating component in addition to rhenium would cause the catalyst stability to suffer markedly. This conclusion also is not correct. Accordingly, it has been found that the catalyst of the present invention surprisingly provides advantages over the Rabo et al. platinum or palladium on molecular sieve hydrocracking catalyst and the Wilson rhenium-silica-alumina hydrocracking catalyst, while unexpectedly being free from disadvantages that the art would lead one to expect. In particular: (1) the presence of the rhenium component results in a catalyst of higher stability than a catalyst that is identical, except that contains no rhenium; and (2) the presence of the Group VIII component results in a catalyst of higher activity than a catalyst that is identical except that contains no Group VIII component.

In accordance with the present invention, therefore, there is provided a hydrocarbon conversion catalyst, particularly useful for hydrocracking, comprising a crystalline zeolitic molecular sieve cracking component, 0.01 to 2.0 weight percent, based on said cracking component and calculated as the metal, of a hydrogenating component selected from platinum, palladium and iridium and compounds of platinum, palladium and iridium, and 0.01 to 2.0 weight percent, based on said cracking component and calculated as the metal, of a hydrogenating component selected from rhenium and compounds of rhenium.

The catalyst of present invention is used in a hydrocracking process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the aforesaid catalyst of the present invention at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering from said reaction zone valuable products, including gasoline.

The crystalline zeolitic molecular sieve component of the catalyst of the present invention may be an ultrastable molecular sieve as discussed hereinafter.

Said catalyst further may additionally comprise a component selected from the group consisting of alumina and silica-alumina and a hydrogenating component selected from the group consisting of Group VI metals and compounds thereof and nickel and compounds thereof. When said catalyst comprises said additional components, preferably the catalyst is prepared by coprecipitation of all non-molecular sieve components to form a slurry, followed by addition of the molecular sieve component to the slurry in particulate form, followed by filtering, washing and drying to produce a hydrogel matrix having the molecular sieve component dispersed therethrough. Preferably the finished catalyst will have substantially all of the catalytic metal or metals located in the matrix, and the molecular sieve component will be substantially in the ammonia or hydrogen form, and will be substantially free of catalytic loading metal or metals; that is, the molecular sieve component will contain less than about 0.5 weight percent of catalytic metals or metals. This result will obtain if the molecular sieve component is added to the slurry of other catalyst components at a pH of 5 or above.

The hydrocarbon feedstock preferably contains less than 1000 p.p.m. organic nitrogen. A prior hydrofining step may be used, if desired, to reduce the feed nitrogen content to the preferred level; however, because of the superior nitrogen tolerance of the molecular sieve component, compared with silica-alumina, the hydrofining step need not accomplish complete nitrogen content reduction, as further discussed hereinafter.

Further in accordance with the present invention, advantageous results are obtained by providing in the reaction zone, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above said catalyst comprising a zeolitic molecular sieve cracking component. In the embodiments of the present invention discussed in this paragraph, no other prior hydrofining step generally will be necessary, because hydrofining is accomplished in one reaction zone concurrently with hydrocracking, together with some hydrogenation of aromatics.

The catalyst of the present invention may be used in a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed being the aforesaid catalyst of the present invention, maintaining said first bed of catalyst and said second bed of catalyst at a temperature in the range 400° to 950° F. and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The catalyst of the present invention may be used in a process whereby the hydrocracking zone may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing the catalyst of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing the catalyst of the present invention.

NITROGEN CONTENT OF FEEDSTOCK

While the present invention can be practiced with utility, when supplying to the hydrocracking zone containing the catalyst of the present invention, hydrocarbon feeds containing relatively large quantities of organic nitrogen, for example several thousand parts per million organic nitrogen, it is preferred that the organic nitrogen content be less than 1000 parts per million organic nitrogen. A preferred range is 0.5 to 1000 parts per million; more preferably 0.5 to 100 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking. Because of the superior tolerance of the molecular sieve component for organic nitrogen compounds, compared with silica-alumina, the hydrofining step need not accomplish complete organic nitrogen content reduction. Further, because of the superior tolerance of the molecular sieve component for ammonia, compared with silica-alumina, and because the molecular sieve component is more tolerant of ammonia than of organic nitrogen compounds, ammonia produced in the hydrofining zone either may be removed from the system between the hydrofining zone and the hydrocracking zone containing the hydrocracking catalyst of the present invention, or may be permitted to pass into the hydrocracking zone along with the feed thereto.

SULFUR CONTENT OF FEEDSTOCK

While the present invention can be practiced with utility when supplying to the hydrocracking zone, containing the catalyst of the present invention, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A CRYSTALLINE ZEOLITIC MOLECULAR SIEVE CRACKING COMPONENT, A RHENIUM OR RHENIUM-COMPOUND HYDROGENATING COMPONENT, AND A HYDROGENATING COMPONENT SELECTED FROM PLATINUM, PALLADIUM, IRIDIUM, OR COMPOUNDS THEREOF

(A) General

The crystalline zeolitic molecular sieve cracking component of the hydrocracking catalyst of the present invention may be of any type that is known in the art as a useful component of a conventional hydrocracking catalyst comprising a noble metal or noble metal-compound hydrogenating component. A decationized molecular sieve cracking component is preferred. Especially suitable are faujasite, particularly Y type and X type faujasite, and mordenite, in the ammonia form, hydrogen form, alkaline earth-exchanged form, or rare earth-exchanged form.

An ultra-stable form of crystalline zeolite molecular sieve is especially preferred, that is, one having a sodium content below about 3 weight percent, calculated as $Na_2O$, a unit cell size below 24.75 angstroms, and a silica/alumina weight ratio above about 2.15.

The rhenium hydrogenating component of the catalyst may be present in the final catalyst in the form of the metal, metal oxide, metal sulfide, or a combination thereof. The rhenium or compound thereof may be combined with the molecular sieve cracking component, or may be combined with other catalyst components in which the molecular sieve cracking component is dispersed, or both. In any case, the rhenium will be present in an amount of 0.01 to 2.0 weight percent, based on the molecular sieve cracking component and calculated as the metal.

The hydrogenating component of the catalyst that is selected from platinum, palladium, iridium, and compounds of platinum, palladium and iridium may be present in the final catalyst in the form of the metal, metal oxide, metal sulfide, or a combination thereof. This component may be combined with the molecular sieve cracking component, or may be combined with other catalyst components in which the molecular sieve cracking component is dispersed, or both. In any case, the component will be present in an amount of 0.01 to 2.0 weight percent, based on the molecular sieve cracking component and calculated as the metal.

A preferred catalyst comprises a molecular sieve cracking component intimately dispersed in a matrix of other catalyst components comprising alumina or silica-alumina. The rhenium or compound thereof, and the platinum, palladium or iridium or compound of platinum, palladium or iridium may be combined with the molecular sieve cracking component before the latter is dispersed in the matrix, or the rhenium or compound thereof and the platinum, palladium or iridium or compound thereof may be a portion of the matrix. Examples of suitable matrices, in addition to matrices consisting of alumina or silica-alumina, include matrices comprising: (a) palladium or a compound thereof and rhenium or a compound thereof and silica-alumina; (b) palladium or a compound thereof and rhenium or a compound thereof and alumina; (c) iridium or a compound thereof and rhenium or a compound thereof and alumina; (d) iridium or a compound thereof and rhenium or a compound thereof and silica-alumina; (e) platinum or a compound thereof and rhenium or a compound thereof and alumina; (f) platinum or a compound thereof and rhenium or a compound thereof and silica-alumina; (g) any of the foregoing with the addition of nickel or a compound therof; if desired, the nickel or compound thereof may be accompanied by a Group VI metal or compound thereof.

The molecular sieve cracking component, when present in a matrix of other catalytic components, or when present as a physical mixture with other separate catalyst components, preferably is present in an amount of 1 to 50 weight percent based on the total weight of all of the catalyst components.

(B) Method of preparation

The molecular sieve cracking component of the catalyst may be prepared by any conventional method known in the art.

In the case wherein rhenium or a compound thereof and platinum, palladium or iridium or compound of platinum, palladium or iridium are added directly to the molecular sieve cracking component, impregnation using aqueous solutions of suitable hydrogenating metal compounds or adsorption of suitable hydrogenating metal compounds are operable methods of incorporating the hydrogenating components or compounds thereof into the molecular sieve. Ion exchange methods whereby the hydrogenating components are incorporated into the molecular sieve by exchanging those components with a metal component already present in the molecular sieve may be used. However, such methods require use of compounds wherein the metals to be introduced into the molecular sieve are present as cations. Compounds wherein rhenium is present as a cation are not commonly available in aqueous solution.

In the case wherein the molecular sieve cracking component first is dispersed in a matrix of other catalytic components and rhenium or a compound thereof and platinum, palladium or iridium or a compound of platinum, palladium or iridium are introduced into the resulting composition, impregnation using an aqueous solution of suitable hydrogenating component compounds or adsorption of suitable hydrogenating component compounds are the preferred methods.

The rhenium compound used in the impregnation or adsorption step generally will contain rhenium in anionic form. The compound should be one that is soluble in water, and that contains no ions that are known as contaminants in hydrocracking catalysts. Suitable rhenium compounds are perrhenic acid, $HReO_4$, and ammonium perrhenate, $NH_4ReO_4$. Impregnation also may be accomplished with an ammoniacal solution of rhenium heptoxide.

The platinum, palladium or iridium compound used in preparing the catalyst may be any convenient compound, for example platinum, palladium or iridium chloride, tetra ammino palladium nitrate, etc.

Where the molecular sieve component, with or without added hydrogenating components, is dispersed in a matrix of other catalyst components, the dispersion may be accomplished by cogelation of said other components around said molecular sieve component in a conventional manner.

Following combination of the catalyst components, the resulting composition may be washed free of impurities and dried at a temperature in the range 500° to 1100° F. for a reasonable time, for example 2 to 48 hours. Particularly when the catalyst comprises an ultra-stable crystalline zeolitic molecular sieve component, it may be subjected, following drying, to a high-temperature thermactivation, at 1200° to 1600° F. for 0.25 to 48 hours, in an oxygen-containing gas stream, which may be air, and which preferably is as dry as practicable.

The finished catalyst may be sulfided in a conventional manner prior to use, if desired. If not presulfided, the catalyst will tend to become sulfided during process operation from any sulfur compounds that may be present in the hydrocarbon feed. As discussed elsewhere herein, the equilibrium degree of sulfiding at a given operating temperature will be different than in a corresponding cata-lytic system wherein a noble metal component alone is present, with no rhenium being present.

SEPARATE HYDROFINING CATALYST

(A) General

As previously indicated, advantageous results are obtained by providing in the reaction zone containing the hydrocracking catalyst of the present invention a separate second catalyst comprising a hydrogenating component selected from Group VI metals and components thereof, a hydrogenating component selected from Group VIII metals and compounds thereof, and a support selected from the group consisting of alumina and silica-alumina. Pellets or other particles of this separate second catalyst may be physically mixed with said hydrocracking catalyst, but preferably are disposed in a separate catalyst bed located ahead of said hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above said hydrocracking catalyst in the same reactor shell.

Where said separate second catalyst is located in the same reactor shell as the hydrocracking catalyst of the present invention, it is preferably present in an amount in the range of 10 to 40 volume percent of the total amount of catalyst in the reactor.

In an arrangement less preferred than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor in the presence of the catalyst of the present invention.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten of compounds thereof, in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| | Percent by weight of total catalyst, calculated as metal | | | $SiO_2/Al_2O_3$ weight ratio |
|---|---|---|---|---|
| | Ni | Mo | W | |
| 1 | 4–10 | 15–25 | | 10/90 to 30/70. |
| 2 | 6–15 | | 15–30 | 30/70 to 50/50. |

(B) Method of preparation

Said separate second catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst of the present invention has activity and stability advantage over a hydrocracking catalyst comprising rhenium and a gel-type silica-alumina. It has been found that use of said separate second catalyst in the above-described arrangements further increases the stability of the hydrocracking catalyst of the present invention, compared with the stibility of the latter catalyst when the identical feed thereto has not been first or concurrently processed in the presence of said separate second catalyst.

OPERATING CONDITIONS

The hydrocracking zone containing the catalyst of the present invention is operated at hydrocracking conditions including a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing the catalyst of the present invention, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst of the present invention in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, a hydrocarbon feedstock as previously described, which in this case may boil above 400° F., is passed through line 1 into hydrocracking zone 2, which contains a hydrocracking catalyst comprising a crystalline zeolitic molecular sieve cracking component, 0.01 to 2.0 weight percent, based on said cracking component, of platinum, palladium or iridium, and 0.01 to 2.0 weight percent, based on said cracking component, of rhenium. As previously discussed, the molecular sieve component may be dispersed in a matrix of other catalyst components, which matrix may contain all or a portion of the hydrogenating components. Also as previously discussed, a separate second catalyst, previously described, may be located in hydrocracking zone 2. The feedstock is hydrocracked in hydrocracking zone 2 at conditions previously described, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5$-180° F. fraction which is withdrawn through line 11, and a 180°–400° F. fraction which is withdrawn through line 12.

Still referring to FIG. 1, the 180°–400° F. fraction in line 12 is reformed under conventional catalytic reforming conditions in reforming zone 13, from which a catalytic reformate is withdrawn through line 14.

Still referring to FIG. 1, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst as described in connection with FIG. 1. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distilaltion column 43, where it is separated into fractions, including a $C_4^-$ fraction which is withdrawn through line 44, a $C_5$-180° F. fraction which is withdrawn through line 45, a 180°–400° F.+ fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating processes for using the catalyst of the present invention. However, it is to be understood that these examples are not intended in any way to limit the scope of the present invention.

Example 1

A rhenium-iridium-crystalline zeolitic molecular sieve catalyst (Catalyst A), in accordance with the present invention, was prepared in the following manner.

These starting materials were used:

(1) 500 grams of a Linde ammonium Y crystalline zeolitic molecular sieve, containing 52.0 weight percent volatiles, primarily $H_2O$ and $NH_3$.

(2) 153 cc. of an aqueous solution of perrhenic acid ($HReO_4$) and chloroiridic acid ($H_2IrCl_6 \cdot H_2O$), said solution containing 3.9 grams of rhenium and 0.313 gram of iridium.

The molecular sieve, in lumpy powder form, was introduced into a Hobart kitchen blender, followed by slow addition of the acid solution while stirring, to form a pasty mass. The pasty mass was transferred to a dish and dried at 120° F. for approximately 16 hours. The resulting dried material was pressed through a 40-mesh screen to obtain fine granules. The granules were blended with a 1% Sterotex lubricant binder, and tabletted. The tablets were calcined in flowing air for 5 hours at 950° F. The tabletted, calcined material was crushed, and a resulting 8–16 mesh fraction thereof was separated for use as a catalyst in the process of the present invention. This catalyst upon analysis was found to contain 1.2% rhenium and 0.1% iridium, amounts approaching the theoretical amounts based on the amounts of ingredients used. This indicated that, although rhenium and iridium oxides normally are quite volatile, in this method of preparation only a small amount of rhenium and iridium was lost during drying and calcination.

Example 2

A rhenium-palladium-crystalline zeolitic molecular sieve catalyst (Catalyst B), in accordance with the present invention, is prepared by the method of Example 1, except that the molecular sieve is loaded with 0.5 weight percent palladium by ion exchange, using tetra ammino palladium nitrate, followed by addition to the molecular sieve of 0.5 weight percent rhenium. The rhenium is added by impregnation, as in Example 1.

Example 3

A rhenium-platinum-crystalline zeolitic molecular sieve catalyst (Catalyst C), in accordance with the present invention, is prepared by the method of Example 1, except that the molecular sieve is loaded with 0.5 weight percent platinum by ion exchange, using tetra ammino platinum nitrate, followed by addition to the molecular sieve of 0.5 weight percent rhenium. The rhenium is added by impregnation, as in Example 1.

Example 4

A rhenium-crystalline zeolitic molecular sieve catalyst (Catalyst D, a comparison catalyst) was prepared in the following manner.

These starting materials were used:

(1) 500 grams of a Linde ammonium Y crystalline zeolitic molecular sieve, containing 27.6 weight percent volatiles, primarily $H_2O$ and $NH_3$.

(2) 300 cc. of an aqueous solution of perrhenic acid ($HReO_4$), containing 5.2 grams of rhenium.

The molecular sieve, in lumpy powder form, was introduced into a Hobart kitchen blender, followed by slow addition of the perrhenic acid solution while stirring, to for a pasty mass. The pasty mass was transferred to a dish and dried at 120° F. for approximately 16 hours. The resulting dried material was pressed through a 40-mesh screen to obtain fine granules. The granules were blended with a 1% Sterotex lubricant binder, and tabletted. The tablets were calcined in flowing air for 5 hours at 950° F. The tabletted, calcined rhenium-molecular sieve material was crushed, and a resulting 8–16 mesh fraction thereof was separated for use as a catalyst. This catalyst upon analysis was found to contain 1.2% rhenium.

Example 5

A palladium-crystalline zeolitic molecular sieve catalyst (Catalyst E, a comparison catalyst), containing 0.5 weight percent palladium, was prepared by ion exchange, using tetra ammino palladium nitrate and an ammonium Y crystalline zeolitic molecular sieve.

Example 6

(A) Comparison Catalyst D of Example 4 was used to hydrocrack a portion of a light cycle oil hydrocarbon feedstock of the following description (Feed I):

| | |
|---|---|
| Gravity, ° API | 19.5 |
| Aniline point, ° F. | 62 |
| Sulfur content, weight percent | 0.43 |
| Nitrogen content, p.p.m. | 330 |
| Aromatics content, liquid vol. percent | 70 |
| Broiling range, ASTM D–1160 distillation: | |
| ST/5 | 381/471 |
| 10/30 | 492/532 |
| 50 | 568 |
| 70/90 | 598/635 |
| 95/EP | 648/681 |

The hydrocracking was accomplished, on a recycle liquid basis, at a pressure of 2100 p.s.i.g., a liquid hourly space velocity of 0.9, and a hydrogen supply rate of 12,000 s.c.f. per barrel of hydrocarbon feedstock, and at a per-pass conversion of 80 volume percent of the feed to products boiling below 400° F. The hydrogen consumption was 2000 s.c.f. per barrel of hydrocarbon feedstock. The hydrocracking was accomplished in a reactor containing a bed of Catalyst D, located below a bed of conventional hydrofining catalyst. The volumetric ratio of Catalyst D to conventional hydrofining catalyst was 4:1. The hydrocarbon feedstock entered the top of the reactor.

(B) Catalyst A of Example 1 was used to hydrocrack a portion of a light cycle oil hydrocarbon feedstock of the following description (Feed II):

| | |
|---|---|
| Gravity, ° API | 17.5 |
| Aniline point, ° F. | 32.5 |
| Sulfur content, weight percent | 0.41 |
| Nitrogen content, p.p.m. | 238 |
| Aromatics content, liquid vol. percent | 76 |
| Boiling range, ° F. | 400–700 |

The hydrocracking was accomplished with the same catalyst bed arrangement, including the bed of conventional hydrofining catalyst, and under the same conditions, as in part (A) of this Example 6.

Example 7

The catalysts of Examples 2, 4 and 5 (Catalysts B, D and E, respectively) are separately used to hydrocrack separate additional portions of Feed I, described in part (A) of Example 6. The hydrocracking is accomplished with the same catalyst bed arrangement, including the bed of conventional hydrofining catalyst, and under the same conditions, as in part (A) of Example 6.

Example 8

The catalysts of Examples 3 and 4 (Catalysts C and D, respectively) are separately used to hydrocrack separate additional portions of Feed II, described in part (B) of Example 6. The hydrocracking is accomplished with the same catalyst bed arrangement, including the bed of conventional hydrofining catalyst, and under the same conditions, as in part (A) of Example 6.

The starting temperatures required to achieve said per-pass conversion of 80 volume percent of the feed to products boiling below 400° F. for Examples 6-8 and the catalyst fouling rates, that is, the hourly rate of temperature increase required to maintain said 80 volume percent per-pass conversion, for Example 7, are as follows:

| | Catalyst | | | | |
|---|---|---|---|---|---|
| | A, ReIr | B, RePd | C, RePt | D, Re | E, Pd |
| Example 6: | | | | | |
| Starting temp., °F | 710(II) | | | 738(I) | |
| Example 7: | | | | | |
| Starting temp., °F | | 710(I) | | 738(I) | 710(I) |
| Fouling rate, °F./hr | | 0.01 | | 0.008 | 0.07 |
| Example 8: | | | | | |
| Starting temp., °F | | | 720(II) | 738(II) | |

From the above-tabulated results, it may be seen that:

(a) Catalyst A has a hydrocracking activity higher than that of comparison Catalyst D (Example 6).

(b) Catalyst B has a hydrocracking activity higher than that of comparison Catalyst D and equal to that of comparison Catalyst E, and has a fouling rate lower than that of comparison Catalyst E and approximately equal to that of comparison Catalyst D (Example 7).

(c) Catalyst C has a hydrocracking activity higher than that of Cataalyst D (Example 8).

CONCLUSIONS

Applicant does not intend to be bound by any theory for the unexpected superior activity and stability of the catalysts of the present invention. However, he assumes that the favorable results are largely attributable to: (1) a different, and more favorable, equilibrium at a given operating temperature for the system consisting of rhenium metal, the various rhenium oxides, the various rhenium sulfides, platinum, palladium or iridium metal, the various oxides of platinum, palladium or iridium, the various sulfides of platinum, palladium or iridium, and sulfur and hydrogen, than for the system consisting of platinum metal, platinum oxide, platinum sulfide, sulfur and hydrogen, which provides a hydrocracking catalyst superior to the Rabo et al. noble-metal-containing catalyst; and (2) interaction between the effect of rhenium or a rhenium compound and a molecular sieve cracking component that produces more favorable hydrocracking results than are produced by any interaction between the effect of rhenium or a rhenium compound and a gel-type silica-alumina cracking component such as is used in the Wilson catalyst.

It has been shown that a process using the catalyst of the present invention has advantages over conventional hydrocracking processes, particularly in that the hydrocracking catalyst comprising a crystalline zeolitic molecular sieve cracking component, a rhenium or rhenium-compound hydrogenating component, and a hydrogenating component selected from platinum, palladium and iridium and compounds of platinum, palladium and iridium, is nitrogen-tolerant and sulfur-tolerant, has a high stability, and has high cracking activity comparable with prior art catalysts.

What is claimed is:

1. A hydrocarbon conversion catalyst comprising a crystalline zeolitic molecular sieve cracking component, 0.01 to 2.0 weight percent, based on said cracking component and calculated as the metal, of a hydrogenating component selected from platinum, palladium and iridium and oxides and sulfides of platinum, palladium, and iridium, and 0.01 to 2.0 weight percent, based on said cracking component and calculated as the metal, of a hydrogenating component selected from rhenium and oxides and sulfides of rhenium.

References Cited
UNITED STATES PATENTS

| | | | |
|---|---|---|---|
| 2,939,847 | 6/1960 | Smith et al. | 252—439 |
| 3,389,965 | 6/1968 | de Ruiter et al. | 252—454 X |
| 3,523,914 | 8/1970 | Mitsche et al. | 252—455 Z |

CARL F. DEES, Primary Examiner

U.S. Cl. X.R.

252—455 Z, 460